Patented Jan. 23, 1940

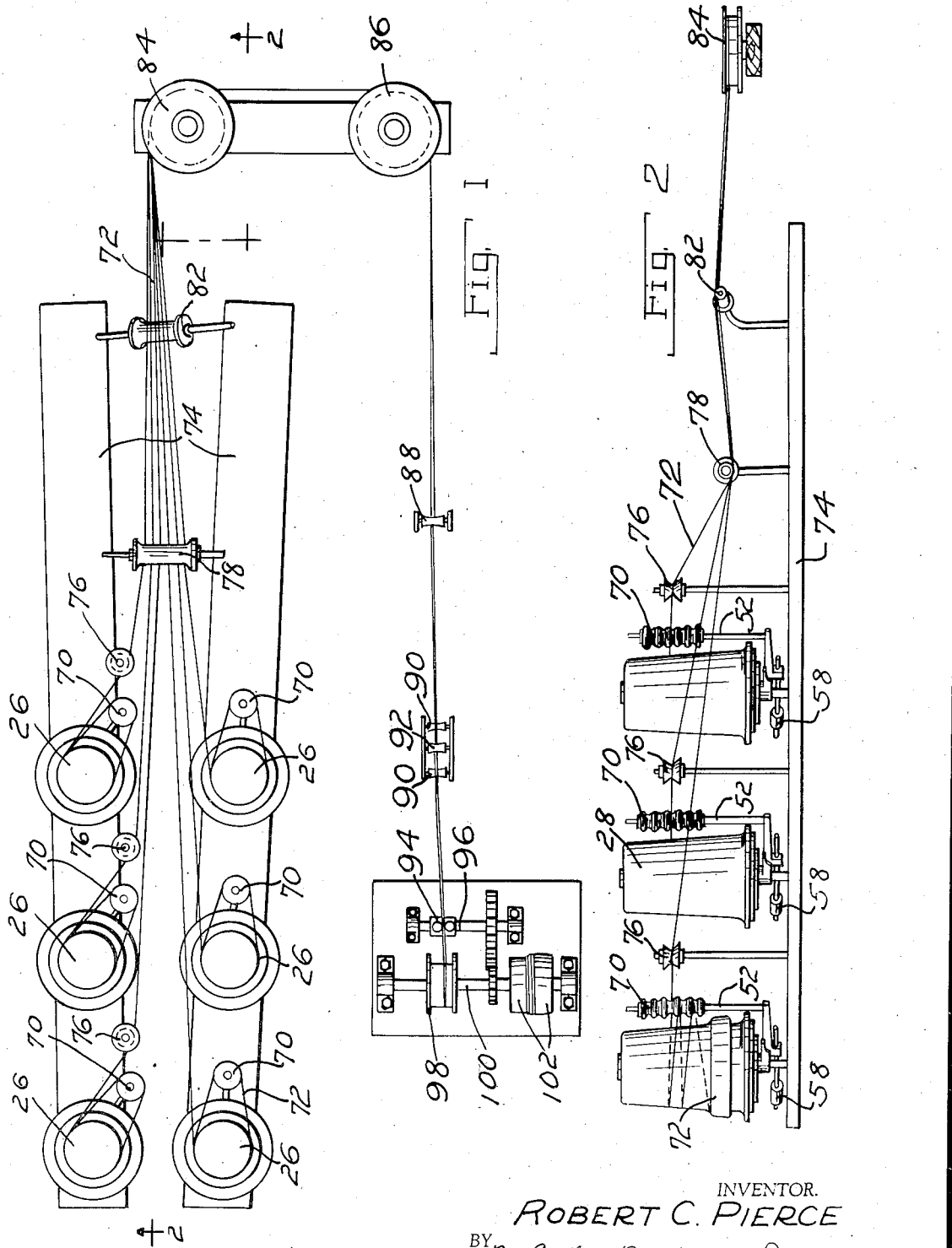

2,187,841

UNITED STATES PATENT OFFICE 2,187,841

WIRE WINDING APPARATUS

Robert C. Pierce, Niles, Mich., assignor to National Standard Company, Niles, Mich., a corporation of Michigan Original application November 29, 1935, Serial No. 52,065. Divided and this application January 28, 1938, Serial No. 187,508

4 Claims. (Cl. 242—25)

This invention relates to apparatus for handling wire, and is illustrated as embodied in apparatus for winding a series or band of wires under uniform tension on a spool or the like.

One of the objects of the invention is to provide apparatus for handling wire in which a plurality of wires may be wound in a substantially flat band on a spool or the like without interference between the adjacent wires.

The apparatus illustrated in the drawing includes a number of vertical swifts, each provided with a novel device for maintaining uniform tension, from which the series of wires is unwound and led to and over a pair of guide rollers. The first guide roller is mounted on a horizontal axis, and maintains the desired spacing of the wires so that they do not interfere with each other; the second guide roller is on an inclined axis and guides them, as a flat band of adjacent but non-interfering wires held under sufficient tension individually to keep them in place, to rollers on vertical axes from which they pass to the means for winding the band of individually-tensioned wires onto a spool or the like.

The above and other objects and features of the invention, including various novel combinations and desirable constructions, will be apparent from the following description of the illustrative embodiment shown in the accompanying drawing, in which:

Figure 1 is a top plan view of the complete apparatus; and

Figure 2 is a section on the line 2—2 of Figure 1, showing the swifts in side elevation.

As shown, a number (e. g. six) of swifts 26, each carrying a coil of wire 72, are mounted on a suitable base 74. The wire from each swift is wound (preferable twice) around the upper part of the upright portion 28 of the swifts and around guide roller 70, and thence (over suitable guiding rollers 76 where needed) to and below a single horizontal guide roller 78 which maintains the wires spaced as desired, in such a manner that they cannot interfere with each other.

The guide rollers 70 are carried by bellcrank levers 52 which carry suitable brake mechanism engageable with the base of the swifts to resist rotation thereof. Weights 58 are provided on the levers 52 urging them in a direction to engage the brakes. The swifts per se are more particularly described and claimed in my copending application Serial No. 52,065, filed November 29, 1935, now U. S. Patent No. 2,127,936, of which this application is a division.

It will be noted that tension on the wires rocks the levers 52 slightly against the resistance of the weights 58, releasing the brakes sufficiently to permit the swift bodies to turn against the resistance thereof. This action operates automatically to keep a uniform tension on each wire.

The wires next pass over an inclined guide roller 82, which directs them as a band of adjacent but non-interfering wires to and over rollers 84 and 86 rotatable on vertical axes, whence they pass (directed by one or more roller guides 88 shown as changing the plane of the wire band from vertical to horizontal) over two rollers 90 and under an intermediate roller 92, which three rollers serve to hold the band of wires with a fixed resistance.

The band of wires is then directed by a reversing carriage 94 operated by the usual double worm 96, to be wound upon a spool or the like 98 mounted on a shaft 100. The shaft 100 is shown geared to the worm 96 and as driven by a pulley mechanism 102 operated by a belt (not shown), or it may be motor driven.

It will be noted that the wires are under tension as they leave the swifts, that they pass under roller 78 under tension, then they pass over the inclined roller 82 under tension, they are still under tension in passing over rollers 88, 90, and 92, and they are finally wound, with the wires still individually tensioned, as a flat band of wires on the spool 98. It will thus be noted that the continuous individual tensioning of the wires aids in controlling them and preventing them from interfering with one another.

The change of the plane of the band of wires from horizontal to vertical and back to horizontal not only permits the building of a compact apparatus since the winding mechanism 94—102 may be placed beside the swifts, but also (by the placing of rollers 82 and 88) aids in controlling the wires.

While one illustrative apparatus has been described in detail, it is not my intention to limit the scope of the invention to that particular apparatus, or otherwise than by the terms of the appended claims.

What is claimed is:

1. In a winding unit including a plurality of swifts rotatable about vertical axes and arranged to permit the unwinding of wire therefrom under substantially uniform tension the combination of, guide rollers receiving wires from said swifts and maintaining them in separated relationship, the first of said rollers being on a horizontal axis and the second being on an inclined axis, guide rollers on vertical axes receiving the wires from the inclined guide roller and feeding them as a band of adjacent parallel wires, and means for winding said band of wires on a spool.

2. In a winding unit including a plurality of swifts rotatable about vertical axes and arranged to permit the unwinding of wire therefrom under substantially uniform tension the combination of, guide rollers receiving wires from said swifts and maintaining them in separated relationship, the first of said rollers being on a horizontal axis and the second being on an inclined axis, the horizontal roller being below the level at which the wires come from the swifts and having said wires passing under it individually tensioned and the inclined roller being higher than the horizontal roller and having the individually tensioned wires passing over it converging into a band of wires arranged side by side, guide rollers on vertical axes receiving the wires from the inclined guide roller and feeding them as a band of adjacent parallel wires, and means for winding said band of wires on a spool.

3. In a winding unit including a plurality of swifts rotatable about vertical axes and arranged to permit the unwinding of wire therefrom under substantially uniform tension the combination of, guide rollers receiving wires from said swifts and maintaining them in separated relationship, the first of said rollers being on a horizontal axis and the second being on an inclined axis, the horizontal roller being below the level at which the wires come from the swifts and having said wires passing under it individually tensioned and the inclined roller being higher than the horizontal roller and having the individually tensioned wires passing over it converging into a band of wires arranged side by side, guide rollers on vertical axes receiving the wires from the inclined guide roller and feeding them as a band of adjacent parallel wires, and means for winding said band of wires on a spool including a roller for turning the band of wires back into a horizontal plane and a horizontal wind-up spool and a reversing carriage for guiding the band of wires onto the spool.

4. In a winding unit including a plurality of swifts rotatable about vertical axes and arranged to permit the unwinding of wire therefrom under substantially uniform tension, the combination of guide rollers receiving wires from said swifts and maintaining them in separated relationship, the first of said rollers being on a horizontal axis and the second being on an inclined axis, guide rollers on vertical axes receiving the wires from the inclined guide roller and feeding them as a band of adjacent parallel wires, and means for winding said band of wires on a spool which is wider than the band of wires, said last named means including a level wind mechanism for guiding the band of wires on to the spool.

ROBERT C. PIERCE.